United States Patent [19]
Groover

[11] 3,932,788
[45] Jan. 13, 1976

[54] AUTOMOBILE HEADLIGHT SWITCH
[75] Inventor: Robert Guy Groover, Savannah, Ga.
[73] Assignee: The Raymond Lee Organization, Inc., New York, N.Y. ; a part interest
[22] Filed: Sept. 17, 1974
[21] Appl. No.: 506,768

[52] U.S. Cl. ............................. 315/82; 307/10 LS
[51] Int. Cl.² ........................................ B60Q 1/04
[58] Field of Search........ 315/77, 82, 83; 307/10 LS

[56] References Cited
UNITED STATES PATENTS
3,341,736  9/1967  Fortney................................. 315/82
3,774,071  11/1973  Goodrich............................. 315/83

*Primary Examiner*—James B. Mullins
*Attorney, Agent, or Firm*—Howard I. Podell

[57] ABSTRACT

A lighting circuit and switch for an automobile which provides an additional switch ON position for the daytime operation of the headlights which ensures that the headlights are turned off when the vehicle engine is stopped. The additional ON position of the lighting switch places the headlight circuit in series with the accessory contacts of the vehicle ignition switch.

1 Claim, 2 Drawing Figures

AUTOMOBILE HEADLIGHT SWITCH

SUMMARY OF THE INVENTION

My invention relates to an automobile headlight circuit and switch, and particularly to a switch which provides an additional ON position for daytime operation of the headlamps that insures automatic turning off of the headlights when the engine is stopped. The additional switch position connects the headlights in series with the accessory contacts of the vehicle ignition switch.

BRIEF DESCRIPTION OF THE DRAWING:

The objects and features of the invention may be understood with reference to the following detailed description of an illustrative embodiment of the invention, taken together with the accompanying drawings in which.

Figure 1:
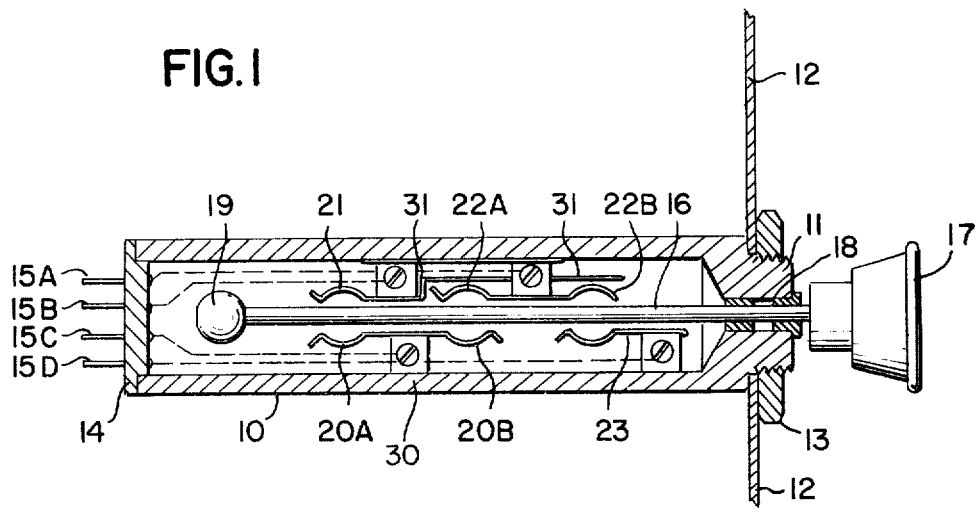
FIG. 1 is a sectional view of the headlight switch of the invention.
Figure 2:
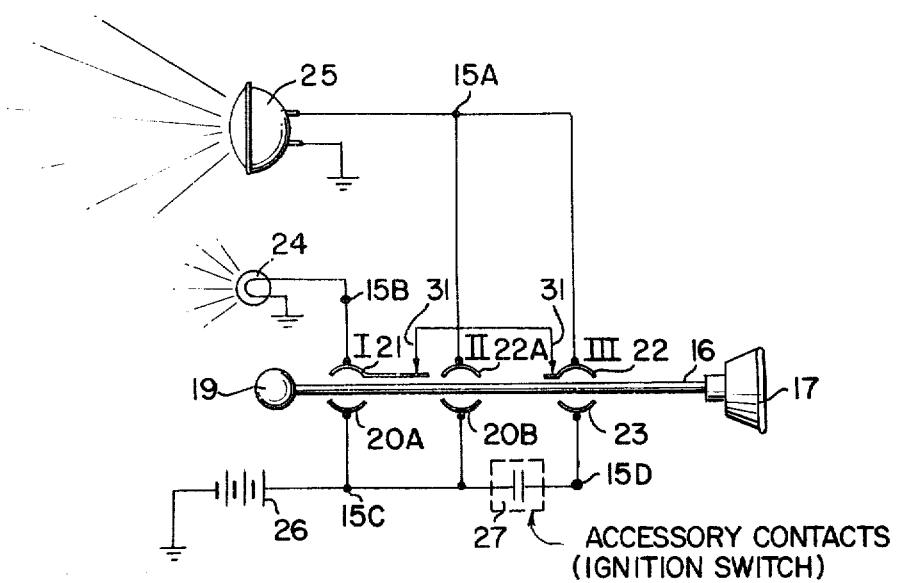
FIG. 2 is a schematic diagram of the circuit.

DESCRIPTION OF THE PREFERRED EMBODIMENT:

Turning now descriptively to the drawings, in which similar reference characters denote similar elements throughout the several views, FIG. 1 illustrates the switch 10 which mounts through panel 12, and is held in place by a mounting nut 13 that engages a threaded bushing 11 of the switch body 30. A header 14, with four terminals 15A, 15B, 15C and 15D for external connections is mounted on the end of the switch body 30. An insulated shaft 16 mounts through an opening 18 in the bushing 11 and is fitted with a knob 17. The internal end of the shaft contains spherical electrical contact 19, which contacts and spreads over the internal switch contacts 20A and 21, or 20B and 22A, or 23 and 22B as determined by the position of switch shaft 16 and contact 19.

In the OFF position, as shown in FIG. 1, no contacts are closed by the switch contact 19.

Pulling shaft knob 17 one position out, results in contact 19 bridging switch contacts 20A and 21 to energize the parking lights and tail light 24 connected to switch terminal 15B, to the battery circuit connected to terminal 15C.

Pulling shaft knob a further position outward results in contact 19 bridging switch contacts 20B and 22A and also spreading contact 22A into engagement with contact 31, to energize the parking and tail light circuit through switch terminal 15B and the normal headlight circuit through contact 15A. Switch contacts 20A and 20B are directly connected to the battery 26 through terminal 15C.

Pulling shaft knob fully outwards to a final position disconnects the previously made contacts and makes contacts 23 and 22B connecting the headlights 25, connected to terminal 15A, to terminal 15D joined to the ignition switch accessory contacts 27 which are in series with the battery 26 when the ignition switch is ON. In this position flange 31 of contacts 21 also engages contact 22B, spread apart by shaft contact 19, to energize the tail light 24 and parking lights when the ignition accessory switch contacts 27 are closed.

Ignition switch accessory contacts 27 are mounted in conventional fashion to close when the ignition key is rotated to the ON position for ignition or the ON position for "Accessory". Alternately, the headlight circuit in series with switch contact 23 may be connected in series with the ignition switch contacts of the ignition lock that are connected only when the ignition key is rotated to the Engine ON position.

In this manner, the operator of the equipped vehicle may safely use his headlights during daytime, with full security that when he stops his vehicle and removes the ignition key, his headlights have been automatically turned OFF.

The normal night time use of headlights, with the engine halted, may be continued with either the lighting switch in the middle ON position, with the ignition switch turned to only close the accessory contacts of the ignition switch.

A relay may be employed in series with the headlight circuit to reduce the current flow across the ignition switch, if desired.

It is to be noted that many test programs have indicated that reduced accident rates occur to vehicles which have their headlights turned ON in daytime use. Motorists have been afraid to turn the lights on during the day because they frequently do not remember with conventional switches to turn them off, upon leaving the vehicle. This invention, when installed with encourage the practice of daytime use of headlights with consequent greater safety.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A light switch fitted with an operating arm for controlling various lights of a vehicle controlled by an ignition switch which provides for a first position of the operating arm in which all lights of the vehicle are OFF, a second position of the operating arm in which only the parking lights and taillights are ON, a third position of the operating arm in which only the headlights and taillights are ON and a fourth position in which only the headlights and taillights of the vehicle are ON when the ignition switch of the vehicle is also ON, said light switch formed of an enclosure in which concave metal contacts are individually mounted about an operating arm mounted to move in an axial direction with respect to the enclosure, with one end of the arm projecting beyond an end of the enclosure and fitted with a knob as a manual grip, said arm fitted with an enlarged section of the arm inside the enclosure, with the exterior of said enlarged section formed of electrically conducting material, said enlarged section fixed in position on said arm, and said concave metal contacts fixed in position to said enclosure such that when the operating arm is slid axially to a first position of the operating arm, the enlarged section does not touch any of the contact members, when the operating arm is slid to a second position of the operating arm, the enlarged section contacts both a first and a second metal contact, when the operating arm is slid to a third position of the operating arm, the enlarged section contacts both a third and a fourth metal contact, and when the operating arm is slid to a fourth position of the operating arm, the enlarged section contacts both a fifth and a sixth metal contact, said metal contact being spring mounted to the enclosure to move in a direction perpendicular to the axis of the arm towards the enclosure when contacted by the enlarged section of the arm, with the second and third contact members electrically connected together and connected to an external terminal for electrical connection to the battery circuit of the vehicle, the first contact member electrically connected to an external terminal for connection to the taillight and parking light circuit of the vehicle, the fourth and fifth metal contact members electrically connected together and connected to an external terminal for connection to the headlight circuit of the vehicle, the sixth metal contact electrically connected to an external terminal for connection to an accessory contact of the ignition switch of the vehicle, said first contact member formed with a flange that extends adjacent to the fourth and the fifth contact members between said contact members and the enclosure, with said flange located so as to be electrically contacted by either the fourth or the fifth contact member when the fourth or the fifth contact member is contacted by the enlarged sections of the arm, said accessory contact of the ignition switch being connected to the battery circuit when the ignition switch is in the ON position.

* * * * *